US012711049B1

(12) United States Patent
Goren et al.

(10) Patent No.: US 12,711,049 B1
(45) Date of Patent: Aug. 18, 2026

(54) SYSTEM AND METHOD FOR CONTINGENCY-TABLE-DRIVEN WEB UI COMPONENT PATTERN RESOLUTION FOR ACCESSIBILITY TESTING

(71) Applicant: Evinced, Inc., Los Altos Hills, CA (US)

(72) Inventors: Daniel Goren, Kfar Bilu (IL); Yossi Synett, Hod Hasharon (IL); Illai Zeevi, Tel Aviv (IL); Gal Moav, Tel Aviv (IL); Navin R. Thadani, Los Altos Hills, CA (US); Tova Bernstein, Beitar Illit (IL); Itzik Basson, Hadera (IL)

(73) Assignee: Evinced, Inc., Los Altos Hills, CA (US)

( * ) Notice: Subject to any disclaimer, the term of this patent is extended or adjusted under 35 U.S.C. 154(b) by 0 days.

(21) Appl. No.: 19/463,254

(22) Filed: Jan. 29, 2026

(51) Int. Cl.
*G06F 11/3668* (2025.01)
*G06F 11/34* (2006.01)

(52) U.S. Cl.
CPC ...... *G06F 11/3688* (2013.01); *G06F 11/3457* (2013.01)

(58) Field of Classification Search
None
See application file for complete search history.

(56) References Cited

U.S. PATENT DOCUMENTS 10,275,339 B2 * 4/2019 Vignesh R ............. G06N 20/00
2014/0330835 A1 * 11/2014 Boyer ................ G06F 16/2379 707/741
2022/0391932 A1 * 12/2022 Schaeppi ........... G06Q 30/0204
2023/0214585 A1 * 7/2023 Hou .......................... G06F 8/53 715/234
2023/0305863 A1 * 9/2023 Riva ..................... G06F 40/284
2025/0028777 A1 * 1/2025 Bloom ................ G06F 16/9024
2025/0036562 A1 * 1/2025 Goren ................ G06F 11/3684
2025/0045190 A1 * 2/2025 Chen .................. G06F 11/3684
2025/0272602 A1 * 8/2025 Kolli ..................... G06N 20/00

FOREIGN PATENT DOCUMENTS

CN 117724988 A * 3/2024
CN 120876746 A * 10/2025 ............. G06N 3/084

* cited by examiner

*Primary Examiner* — Philip Wang
(74) *Attorney, Agent, or Firm* — M&B IP Analysts, LLC

(57) ABSTRACT

The method and system for resolving conflicting user-interface (UI) component classifications for accessibility testing are presented. The method includes determining, for a rendered user-interface component in a document object model (DOM), a component root for a candidate UI element using a tight-ancestor DOM traversal; generating, using a trained visual-pattern detection model operating on rendered pixel data, a visual-pattern label for the candidate UI element; generating, for the candidate UI element, a semantic-pattern label using a semantic classification engine that evaluates at least accessibility metadata; executing a machine-implemented resolution logic that evaluates the visual-pattern label and the semantic-pattern label of the candidate UI element to determine an appropriate resolution action for the candidate UI element; and when the resolution logic determines that a definitive behavioral pattern can be assigned to the candidate UI element, executing an accessibility test suite selected according to the definitive behavioral pattern.

19 Claims, 7 Drawing Sheets

600

| | Seman-tic Pattern (602) | Complexity (604) | Visual Pattern (606) | Visual Pattern Type (608) | Resolution Type (610) | Final Pattern (612) | Issue Type (614) |
|---|---|---|---|---|---|---|---|
| 1 | Bread-crumb | advanced (alternating list of links) | Card-horizontal | Layout | Ignore | N/A | N/A |
| 2 | Bread-crumb | advanced (alternating list of links) | Form | Landmark | Accessibility-issue | N/A | Suspicious semantics |
| 3 | Bread-crumb | advanced (alternating list of links) | Button-spin | Interactive | Accessibility-issue | N/A | Semantics conflict with visual appearance |
| 4 | Button | Semantic (role) | Editable-Textbox | Interactive | Uncertain-pattern | Uncertain Inter-active | N/A |
| 5 | Dialog | Semantic (role) | Carousel | Composite | Semantic-pattern | Dialog | N/A |
| 6 | Dialog | Semantic (role) | Disclosure-accordion | Interactive | Uncertain-pattern | Uncertain Inter-active | N/A |
| 7 | Dialog | Semantic (role) | Slider | Interactive | Accessibility-issue | N/A | Semantics conflict with visual appearance |
| 8 | List | Semantic (role) | Accordion | Composite | Uncertain-pattern | Uncertain Navi-gation | N/A |
| 9 | List | Semantic (role) | Dialog | Popup | Accessibility-issue | N/A | Missing semantics |
| 10 | N/A | N/A | Slider-multi-thumb | Composite-layout | Visual-pattern | Multi-thumb-slider | N/A |
| 11 | List-item | Semantic (role) | Search-magnifying-glass | Interactive | Accessibility-issue | N/A | Wrong semantics |
| 12 | Menu-popup | Semantic (role) | Checkbox-group-classic | Composite-layout | Ignore | N/A | N/A |
| ... | ... | ... | ... | ... | ... | ... | ... |

FIG. 6

SYSTEM AND METHOD FOR CONTINGENCY-TABLE-DRIVEN WEB UI COMPONENT PATTERN RESOLUTION FOR ACCESSIBILITY TESTING

BACKGROUND

Modern web interfaces increasingly rely on complex, component-based UI frameworks that generate deeply nested DOM structures, dynamic overlays, and visually intricate components. Although these components may appear uniform and intuitive to sighted users, the accessibility semantics embedded within the DOM often diverge significantly from their visual presentation. Developers may use non-semantic HTML elements for stylistic convenience, fail to update ARIA attributes when refactoring components, or incorporate third-party component libraries whose internal structures obscure the true interactive element intended for user interaction. As a result, visually similar patterns often behave differently, and structurally similar DOM patterns may represent entirely different user experiences.

Traditional automated accessibility testing tools operate either by parsing the DOM statically or by applying simple heuristics on semantic roles and attributes. These tools assume that the developer has correctly marked the accessibility semantics within the DOM and therefore cannot identify cases in which the visual appearance of a component meaningfully contradicts its declared semantics. For example, a visually styled button implemented as a link, or a hamburger icon that opens a modal instead of a menu, will often be misclassified by existing systems because they rely solely on DOM semantics or pattern-specific rules. In practice, this leads to false negatives when invalid patterns go undetected, and false positives when legitimate components are flagged incorrectly due to minor or inconsistent markup.

Further, conventional solutions identify visual patterns but cannot deduce true behavioral semantics. Conversely, semantic-only audits assume that developers have authored correct ARIA roles and attributes, an assumption that does not hold in real-world complex systems. Traditional tools fail to merge these two signals and often generate false positives by misclassifying visually misleading elements or false negatives by ignoring cases in which visual and semantic cues conflict. As a result, existing systems lack a principled mechanism for resolving disagreements between visual and semantic evidence and for determining when interactive probing is necessary to establish the true behavior of an element.

It would therefore be advantageous to provide a solution that addresses the above challenges.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include determining, for a rendered user-interface component in a document object model (DOM), a component root for a candidate UI element using a tight-ancestor DOM traversal; generating, using a trained visual-pattern detection model operating on rendered pixel data, a visual-pattern label for the candidate UI element; generating, for the candidate UI element, a semantic-pattern label using a semantic classification engine that evaluates at least accessibility metadata; executing a machine-implemented resolution logic that evaluates the visual-pattern label and the semantic-pattern label of the candidate UI element to determine an appropriate resolution action for the candidate UI element; and when the resolution logic determines that a definitive behavioral pattern can be assigned to the candidate UI element, executing an accessibility test suite selected according to the definitive behavioral pattern. Other embodiments of this aspect include corresponding computer systems, apparatus, and computer programs recorded on one or more computer storage devices, each configured to perform the actions of the methods.

Implementations may include one or more of the following features. The method where, when the resolution logic determines that a definitive behavioral pattern of the candidate UI element is not certain, invoking an interactive-probing mechanism to determine a definitive behavioral pattern of the candidate UI element.

The method where the interactive-probing mechanism further may include: simulating input events directed to the candidate UI element; and evaluating DOM mutations as a result of the simulated input events to determine a definitive behavioral pattern of the candidate UI element.

The method where, when the resolution logic identifies at least inadequate semantics associated with the candidate UI element, generating an accessibility violation signal without executing an accessibility test suite.

The method where the resolution logic is implemented using a contingency-based classification mechanism that encodes empirically derived relationships between visual-pattern labels, semantic-pattern labels, and behavioral analytics of various UI elements.

The method where the contingency-based classification mechanism is implemented using a multi-dimensional data structure that stores resolution rules derived from statistical analysis of UI behavior across a corpus of web pages; retrieving, by one or more processors, datasets of rendered web pages including rendered visual representations and corresponding DOM states; computing, for a plurality of UI elements extracted from the datasets, respective visual-pattern labels using the trained visual-pattern detection model operating on rendered pixel data; computing, for the plurality of UI elements, respective semantic-pattern labels using the semantic classification engine; and storing representative pairs of computed visual-pattern labels and semantic-pattern labels in a multi-dimensional data structure that encodes the resolution logic for each pair.

The method where storing the representative pairs further may include: computing, for each pair, one or more statistical measures characterizing observed behavioral outcomes of the corresponding UI elements; and classifying each pair according to a resolution category selected from a plurality of resolution categories, where each resolution category corresponds to a resolution action; computing a component root for each UI element of the plurality of UI elements, where the component root represents a target component for accessibility testing; and generating, in the multi-dimensional data structure, an alignment key, using the component root, to associate the visual pattern labels and semantic-pattern labels. Implementations of the described techniques may include hardware, a method or process, or a computer tangible medium.

In one general aspect, non-transitory computer-readable medium may include one or more instructions that, when executed by one or more processing circuitries of a device, cause the device to: determine, for a rendered user-interface component in a document object model (DOM), a component root for a candidate UI element using a tight-ancestor DOM traversal; generate, using a trained visual-pattern detection model operating on rendered pixel data, a visual-pattern label for the candidate UI element; generate, for the candidate UI element, a semantic-pattern label using a semantic classification engine that evaluates at least accessibility metadata; execute a machine-implemented resolution logic that evaluates the visual-pattern label and the semantic-pattern label of the candidate UI element to determine an appropriate resolution action for the candidate UI element; when the resolution logic determines that a definitive behavioral pattern can be assigned to the candidate UI element, execute an accessibility test suite selected according to the definitive behavioral pattern. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to: determine, for a rendered user-interface component in a document object model (DOM), a component root for a candidate UI element using a tight-ancestor DOM traversal; generate, using a trained visual-pattern detection model operating on rendered pixel data, a visual-pattern label for the candidate UI element; generate, for the candidate UI element, a semantic-pattern label using a semantic classification engine that evaluates at least accessibility metadata; execute a machine-implemented resolution logic that evaluates the visual-pattern label and the semantic-pattern label of the candidate UI element to determine an appropriate resolution action for the candidate UI element; when the resolution logic determines that a definitive behavioral pattern can be assigned to the candidate UI element, execute an accessibility test suite selected according to the definitive behavioral pattern. Other embodiments of this aspect include corresponding computer systems, apparatus, and computer programs recorded on one or more computer storage devices, each configured to perform the actions of the methods.

Implementations may include one or more of the following features. The system where, when the resolution logic determines that a definitive behavioral pattern of the candidate UI element is not certain, invoking an interactive-probing mechanism to determine a definitive behavioral pattern of the candidate UI element.

The system where the memory contains further instructions that, when executed by the processing circuitry for the interactive-probing mechanism, further configure the system to: simulate input events directed to the candidate UI element; and evaluate DOM mutations as a result of the simulated input events to determine a definitive behavioral pattern of the candidate UI element.

The system where, when the resolution logic identifies at least inadequate semantics associated with the candidate UI element generating an accessibility violation signal without executing an accessibility test suite.

The system where the resolution logic is implemented using a contingency-based classification mechanism that encodes empirically derived relationships between visual-pattern labels, semantic-pattern labels, and behavioral analytics of various UI elements.

The system where the contingency-based classification mechanism is implemented using a multi-dimensional data structure that stores resolution rules derived from statistical analysis of UI behavior across a corpus of web pages.

The system where the memory contains further instructions which when executed by the processing circuitry further configure the system to: retrieve, by one or more processors, datasets of rendered web pages including rendered visual representations and corresponding DOM states; compute, for a plurality of UI elements extracted from the datasets, respective visual-pattern labels using the trained visual-pattern detection model operating on rendered pixel data; compute, for the plurality of UI elements, respective semantic-pattern labels using the semantic classification engine; and store representative pairs of computed visual-pattern labels and semantic-pattern labels in a multi-dimensional data structure that encodes the resolution logic for each pair.

The system where the memory contains further instructions that, when executed by the processing circuitry for storing the representative pairs, further configure the system to: compute, for each pair, one or more statistical measures characterizing observed behavioral outcomes of the corresponding UI elements; and classify each pair according to a resolution category selected from a plurality of resolution categories, where each resolution category corresponds to a resolution action.

The system where the memory contains further instructions which when executed by the processing circuitry further configure the system to: compute a component root for each UI element of the plurality of UI elements, where the component root represents a target component for accessibility testing; and generate, in the multi-dimensional data structure, an alignment key, using the component root, to associate the visual pattern labels and semantic-pattern labels. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 illustrates an example contingency table configured to resolve conflicts between semantic patterns and visual patterns detected for web user interface (UI) components, according to an embodiment.

DETAILED DESCRIPTION

Figure 1:
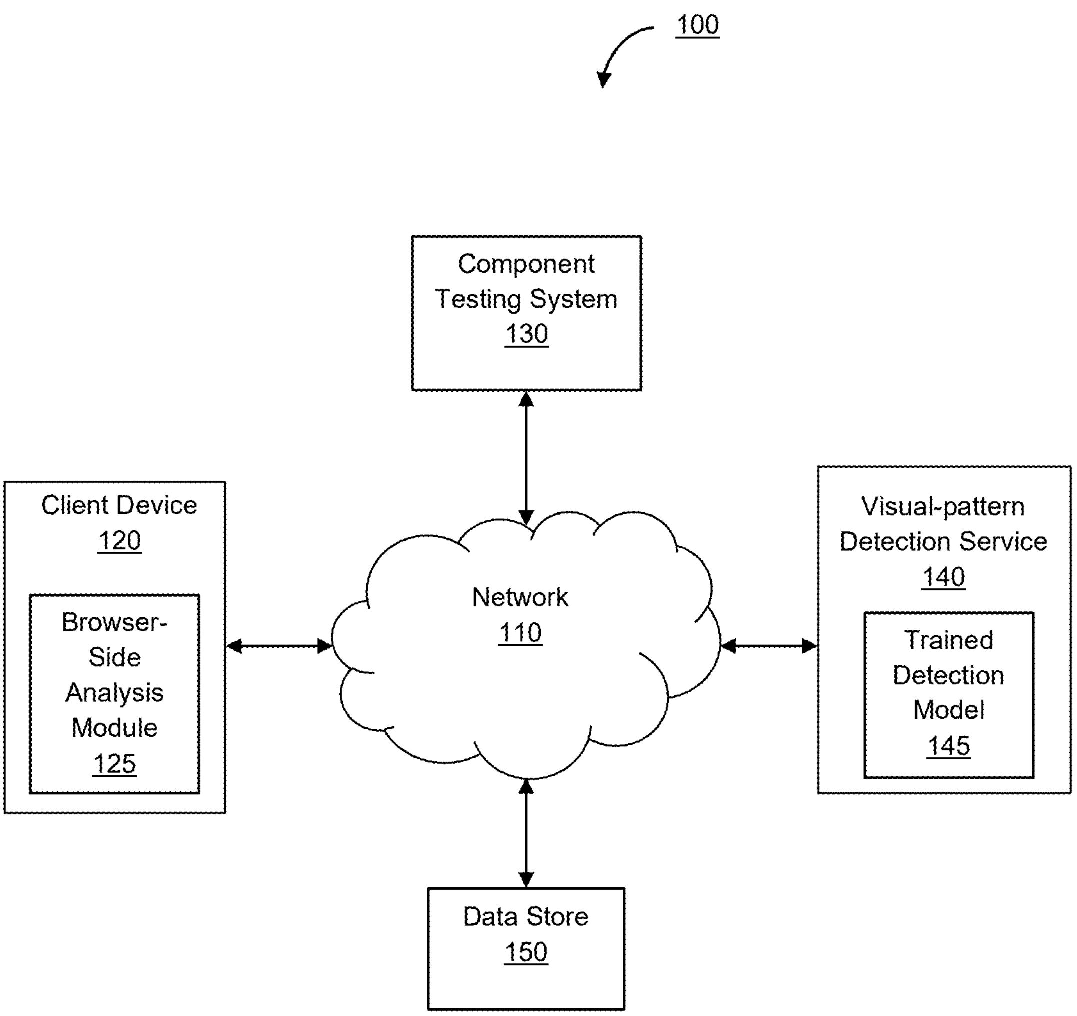
FIG. 1 shows an example network diagram utilized to describe the various disclosed embodiments.

It is important to note that the embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide a structured, empirical, and highly reliable method for resolving the final UI pattern of an element even when visual patterns and semantic patterns disagree. By constructing and using a multi-row contingency table that enumerates all combinations of visually detected patterns and semantically inferred patterns, the disclosed embodiments eliminate many sources of false positives while enabling deterministic and predictable outcomes. The contingency table allows for immediate identification of accessibility violations and ambiguous cases requiring further interaction. When uncertainty is determined using the contingency-table mechanism, the disclosed embodiments allow for gathering behavioral evidence of the element via targeted interactions, ensuring that ambiguous patterns such as, but not limited to, combo boxes, textboxes, spin buttons, and modal launchers are correctly distinguished. Thus, the disclosed embodiments achieve accurate classification at scale, reduce developer false alarms, and allows accessibility testing to proceed with confidence in the identified component type.

FIG. 1 shows an example network diagram 100 utilized to describe the various disclosed embodiments. One or more client devices 120, a component testing system 130, a visual-pattern detection service 140, a trained detection model 145, and a data store 150 are operatively coupled to exchange data, either through a network 110, through local inter-process communication, or through a combination thereof.

The network 110, when present, may include one or more public or private networks, such as the Internet, corporate intranets, wireless networks, or any combination thereof. In some embodiments, two or more of the client devices 120, the component testing system 130, the visual-pattern detection service 140, and the data store 150 may execute on the same physical computing device without requiring network communication.

In some embodiments, the client devices 120 may be developer workstations, build servers, automated test agents, browser extensions, or other computing devices capable of loading a web page to be analyzed. A browser-side analysis module 125 executing in association with a browser environment is configured to receive a live web page and capture a rendered screenshot along with a structured representation of the DOM. The browser-side analysis module 125 is further configured to compute an enriched DOM representation including accessibility metadata. The screenshot and enriched DOM representation are provided as inputs to the visual-pattern detection service 140, which applies the trained detection model 145 to identify visual UI elements and corresponding visual pattern labels.

In some embodiments, browser-side analysis module 125 may be implemented as a JavaScript-based analysis bundle that is injected into, embedded within, or otherwise executed in association with a web page loaded in a browser environment of the client device 120. The browser-side analysis module 125 is configured to operate within the execution context of the web page and has access to the live DOM, rendering state, and browser-provided APIs.

In some embodiments, the browser-side analysis module 125 is configured to compute an enriched DOM representation using an accessibility-analysis sub-module, such as an accessibility core engine. The enriched DOM representation includes structural information derived from the DOM tree together with accessibility metadata, including but not limited to accessibility roles, states, properties, accessible names, focusability indicators, event listeners, visibility state, and geometric bounding information. The browser-side analysis module 125 is configured to traverse the entire DOM to derive semantic and structural features for all elements present on the page, independent of whether those elements are visually detected by downstream models.

The browser-side analysis module 125 is further configured to capture a screenshot of the rendered web page directly from the browser environment. The screenshot represents the visual appearance of the page as presented to a sighted user at the time of analysis and may be captured using browser-native APIs, offscreen rendering techniques, or equivalent mechanisms. The screenshot capture may occur before, after, or concurrently with DOM enrichment, and may be repeated in response to state changes or interaction-driven mutations.

In some embodiments, the visual-pattern detection service 140 is configured to receive image data and textual data representing a rendered user interface and to apply trained detection model 145 to identify visual UI elements. In some embodiments, as mentioned above, image data, textual data, and the like is captured by browser-side analysis module 125 and transmitted to the visual-pattern detection service 140 through an application programming interface (API). The visual-pattern detection service 140 is configured to perform visual inference. In some embodiments, visual-pattern detection service 140 (via bounding-box-to-DOM-matching module 210, FIG. 2) is configured to match the visual detections to DOM elements in the enriched DOM representation. The visual-pattern detection service 140 is not required to load or render the web page itself, and in various embodiments does not have access to the DOM or to persistent system storage beyond model artifacts required for inference.

As used herein, the term "web page" refers to a rendered document represented internally as a DOM tree in a browser process. The web page may be rendered locally or accessible over a network. The term "DOM" refers to the Document Object Model, a structured representation of elements, attributes, and hierarchical relationships present in the web page. The term "accessibility metadata" refers to ARIA attributes, accessibility roles, state and property values, focusability, derived accessible names, a combination thereof, and the like that are exposed to assistive technologies through an accessibility tree.

As used herein, the term "accessibility technology" or "assistive technology" refers to any software or hardware mechanism that enables users with disabilities to access and interact with digital content, including but not limited to screen readers, magnifiers, voice-control systems, switch devices, alternative input systems, and operating-system accessibility services that expose an accessibility tree derived from the DOM. The term "graphical user interface (GUI)" refers to the visual presentation of interactive elements rendered within a web browser or other display surface, including but not limited to buttons, icons, menus, dialogs, forms, tabs, panels, lists, and other visible components. The term "UI component" refers to any interactive element or composite structure within a GUI that provides a specific user-facing function. An "interactive UI component" refers to a component that can be directly activated or manipulated by a user, such as a button, link, text field, checkbox, radio button, slider, or spin button. A "composite UI component" refers to a component consisting of a logical grouping of multiple interactive elements, such as a combo box containing an editable text field and a list of options, a menu containing menu items, a tab list containing tabs and a tab panel, or a disclosure control paired with content panels. The term "component behavior" refers to the expected interaction model, state transitions, and accessibility-exposed semantics that define how an interactive or composite UI component is intended to function. The term "rendered state" refers to the actual visual and structural configuration of the webpage at the moment it is captured by the system, including dynamic content, script-generated elements, overlays, conditional panels, or other transient interface states. The term "accessibility tree" refers to a structured representation produced by browsers and operating systems that convey the semantic roles, names, states, and hierarchical relations of elements to assistive technologies, distinct from the DOM tree but derived from it.

The term "visual pattern label" refers to a label such as "button", "menu", "checkbox", "tab", or similar, produced by the trained detection model 145 in response to the screenshot and associated with a bounding box on the rendered page. The term "semantic pattern label" refers to a label describing the intended accessibility semantics of a component as inferred from the DOM and accessibility metadata. The term "component root" refers to the DOM element that is treated as the primary interactive target of a UI pattern, for example, the element that receives focus or is announced by a screen reader. The term "tight ancestor" refers to an ancestor element whose bounding box tightly encloses a set of descendants associated with the same perceived component, and which is used to determine the component root. The term "pattern type" refers to the final classification of a component after combining visual and semantic signals and, where needed, the results of uncertainty-resolving interactions. The term "accessibility test" refers to a sequence of automated interactions and validations performed against a component to determine whether it conforms to accessibility guidelines. The term "accessibility issue" refers to a detected deviation of the observed behavior or metadata from an expected requirement for accessibility compliance.

Additionally, the term "enriched DOM representation" refers to a DOM structure augmented with derived metadata, including element visibility, geometric bounding rectangles, pointer-interaction indicators, accessible names, ARIA attributes, accessibility roles, and focusability status. The term "selector" refers to a uniquely generated or synthesized CSS-style reference that unambiguously identifies a specific DOM element for the purposes of testing and reporting. The term "pattern signal" refers to either the visual pattern label produced by the trained detection model 145 or the semantic pattern label produced by the DOM-semantic classifier, each representing an independent hypothesis regarding the UI component type. The term "contingency table" refers to a predetermined matrix or mapping that correlates combinations of pattern signals with system actions such as declaring a final pattern (hereinafter, final pattern, final behavioral pattern, definitive behavioral pattern, definitive functional pattern, and the like), flagging an accessibility violation, performing uncertainty-handling interactions, or disregarding non-actionable combinations. The term "component group" refers to a set of DOM elements that visually or structurally function as parts of a single UI component and are used collectively during tight-ancestor analysis. The term "interaction mutation" refers to any change in DOM structure, accessibility metadata, or rendered view caused by simulated user interactions intended to resolve pattern ambiguity.

The trained detection model 145 of the visual-pattern detection service 140 refers broadly to any machine-learning or deep-learning system configured to process multimodal inputs, including, but not limited to image data and textual data, and to produce one or more outputs describing visual structures or objects present in image data. In some embodiments, the trained detection model 145 may be implemented as an object-detection neural network trained on UI screenshots, such as a convolutional neural network (CNN), a transformer-based vision model, a hybrid vision-language model, a region-based detection architecture, a multi-modal model, and the like. The trained detection model 145 is configured to accept an image of a rendered page and to output predicted bounding boxes, classification labels identifying visually recognizable UI components (for example, buttons, menus, checkboxes, sliders, tab lists, navigation bars, dialog triggers, combo boxes, or other interface elements), and optional confidence values. The model may be trained using supervised learning, semi-supervised learning, or reinforcement learning techniques, and training data may include annotated screenshots, synthetic renderings, augmented images, or multimodal representations incorporating both images and structural layout metadata. The trained detection model 145 is configured to provide a visual pattern-detection signal that reflects how a sighted user would perceive the interface, independent of the underlying DOM semantics.

In some embodiments, a semantic classifier (e.g., DOM-semantic classifier 220, FIG. 2) is configured to analyze the enriched DOM representation to determine, for DOM elements, semantic pattern labels that reflect how assistive technologies are expected to interpret corresponding UI components. The semantic classifier is configured to evaluate accessibility roles, ARIA attributes, state and property values, focusability indicators, accessible names, event-listener indicators, hierarchical grouping, list membership, and relationship attributes (e.g., aria-controls, aria-expanded, aria-haspopup, aria-owns, labeling associations, and the like), and to apply a semantic pattern algorithm that assigns a semantic pattern label to each candidate element. In some embodiments, the semantic pattern algorithm includes one or more deterministic classification rules and/or a trained classifier that maps such accessibility metadata and structural features to semantic pattern hypotheses (e.g., button, link, checkbox, menu, dialog trigger, combo box, tab, listbox, and the like). The semantic pattern labels produced by the semantic classifier are provided, together with the visual pattern labels produced by the trained detection model 145, as independent pattern signals to a pattern-association engine (e.g., pattern-association engine 240, FIG. 2) for reconciliation and final pattern determination.

In some embodiments, data store 150 is configured to be utilized in offline workflows, including model training, contingency-table mechanism, statistical analysis, and backward compatibility management. During runtime analysis of an individual webpage, the component testing system 130 may operate without accessing the data store 150, using transient in-memory data structures to hold enriched DOM representations, contingency-table mechanism, and detected accessibility issues. In such embodiments, the trained model artifacts deployed for inference are stored locally within the visual-pattern detection service 140, while historical artifacts and prior versions are retained in the data store 150 for development and tuning purposes.

In certain embodiments, the data store 150 also stores the contingency table used by the pattern-association engine, including the mapping between pairs of visual pattern labels and semantic pattern labels and the associated system actions. In some embodiments, the data store 150 holds the output of pattern-mining pipelines, including annotated samples collected from large sets of web pages, which may be used for refining the contingency table or training future semantic pattern algorithms.

The data store 150 may be realized as one or more persistent storage systems, including distributed cloud storage, object storage systems such as Amazon S3 or Google Cloud Storage, relational or non-relational databases, or local storage volumes. The data store 150 may support indexed access to DOM snapshots, selectors, component root identifiers, accessibility violations, and uncertainty-handling results. The data store 150 may also store a fingerprinting registry used to correlate elements across DOM mutations by comparing semantic hierarchies, accessible-name paths, tight-ancestor structures, and fuzzy-matching similarity metrics. The data store 150 thereby provides a durable, queryable repository supporting both runtime operation of the system and offline training, tuning, and analysis workflows.

In some embodiments, component testing system 130 is configured to reconcile visual pattern detections and semantic pattern detections using component roots as alignment keys. This reconciliation may include cases in which only one detection signal is present for a given component. A pattern-association engine (pattern-association engine 240, FIG. 2) within the component testing system 130 applies a contingency-table mechanism to determine whether a final pattern classification can be selected, whether an inherent accessibility violation is indicated, or whether additional uncertainty resolution is to be applied.

In some embodiments, other alignment mechanisms may additionally or alternatively be employed to associate a visually perceived component with a corresponding semantically inferred component. For example, in some embodiments the component testing system 130 is configured to align detections based on geometric correspondence between a visual bounding box and one or more element bounding rectangles derived from the enriched DOM representation, including overlap scores, containment relationships, and tight-ancestor cluster membership. In some embodiments, alignment is performed using selectors or other stable element identifiers generated for DOM nodes, such that a semantic pattern label assigned to a given selector is matched to a visual detection mapped to the same selector. In some embodiments, alignment is performed by traversing, and computing proximity within, an accessibility tree derived from the DOM, such as by identifying a closest ancestor or closest interactive relative that is exposed to assistive technologies and best corresponds to the visually detected region.

When ambiguity remains, the component testing system 130 is further configured (via interactive probing module 250, FIG. 2) to perform targeted user-interaction simulations to observe resulting DOM mutations and thereby resolve the component's actual behavior. Based on observed behavior, the component testing system 130 is configured to determine a final pattern classification and execute a pattern-specific accessibility test suite (pattern-specific testing suite 260, FIG. 2) corresponding to the final behavior pattern. The component testing system 130 is configured to generate an accessibility report and emits fingerprint-relevant metadata for downstream aggregation by a separate platform service. Test results and detected accessibility issues are then provided to a report-generation subsystem (accessibility report interface 270, FIG. 2).

In some embodiments, the component testing system 130 interfaces with, and may be injected into, the browser-side analysis module 125 executing within a browser on a client device 120. In this embodiment, the component testing system 130 executes locally within the browser environment and performs semantic analysis, component root resolution, contingency-table mechanism, uncertainty handling, and pattern-specific accessibility testing directly against the live DOM of the web page. The component testing system 130 may operate as part of, or in coordination with, the browser-side analysis module 125, sharing access to the enriched DOM representation, accessibility metadata, and runtime interaction capabilities provided by the browser environment. In some embodiments, component testing system 130 executing via the browser-side analysis module 125 is configured to transmit selected data to the visual-pattern detection service 140 over a network (e.g., network 110, FIG. 1). It should be noted that operations configured to be executed by component testing system 130 at runtime do not require access to the data store 150.

The component testing system 130 can be realized in software, hardware, firmware, or a combination thereof. The software comprises one or more computer-readable storage media storing instructions that, when executed by one or more processors, cause the system to perform one or more functions as described herein. The software may be implemented in various programming languages and may operate on different computing environments, including but not limited to cloud-based systems, distributed networks, standalone computing devices, or embedded systems. The software may include algorithms, machine learning models, or rule-based processing to achieve the described functionality. Various implementations may employ modular, service-oriented, or microservices architectures, and the system may interface with databases, APIs, or external services.

Although FIG. 1 shows example elements of the network diagram 100, in some implementations, the network diagram 100 may include additional elements, fewer elements, different elements, or differently arranged elements than those depicted in FIG. 1.

Figure 2:
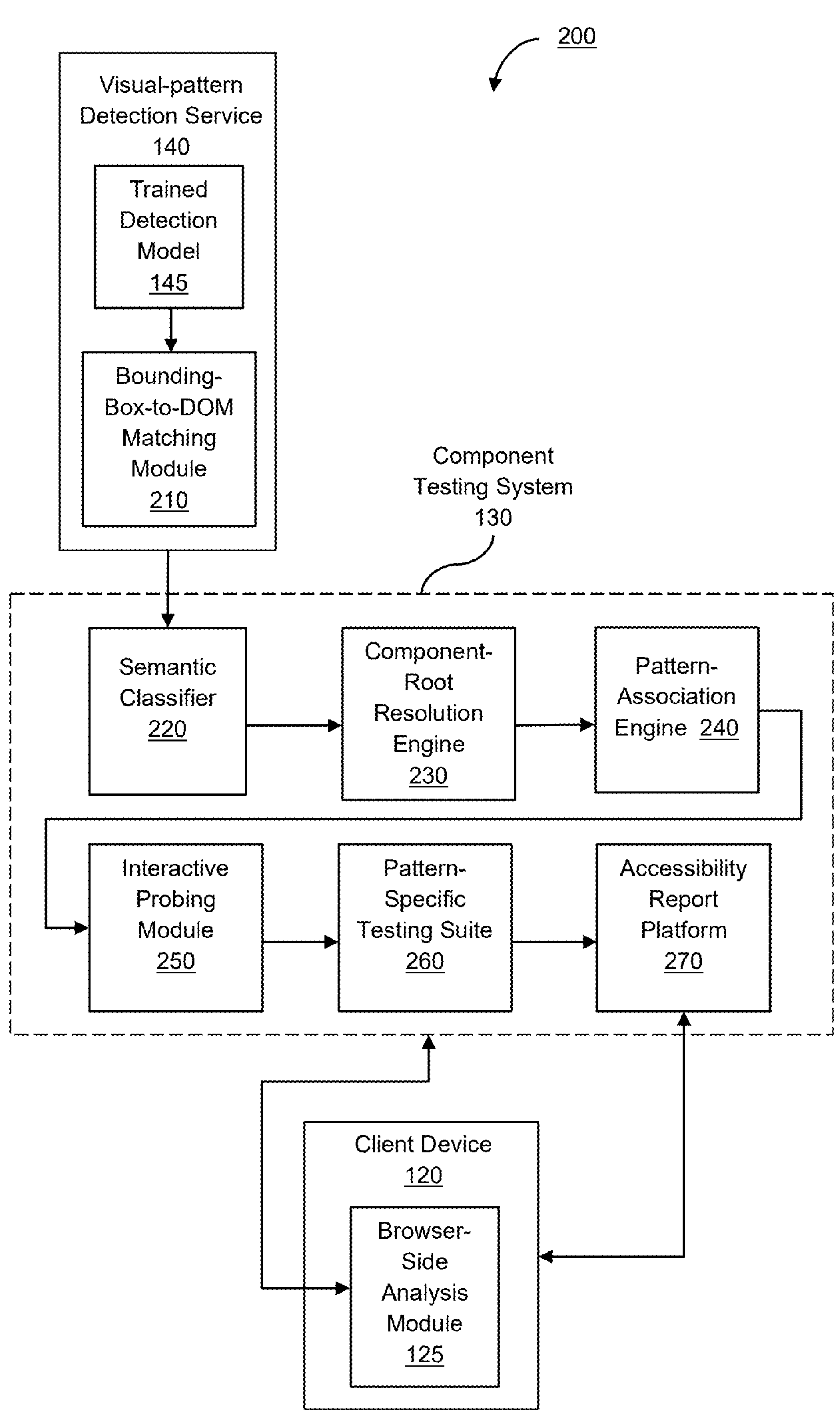
FIG. 2 is a functional block diagram of an example accessibility analysis system according to an embodiment.

FIG. 2 is a functional block diagram of an example accessibility analysis system 200 according to an embodiment. Component testing system 130 includes bounding-box-to-DOM matching module 210, DOM-semantic classifier 220, component root resolution engine 230, pattern-association engine 240, interactive probing module 250, pattern-specific testing suite 260, and accessibility report interface 270.

A browser-side analysis module 125 executing in association with a browser environment is configured to receive a live web page and capture a rendered screenshot along with a structured representation of the DOM. The browser-side analysis module 125 is further configured to compute an enriched DOM representation including accessibility metadata. The screenshot and enriched DOM representation are provided as inputs to the visual-pattern detection service 140, which applies the trained detection model 145 to identify visual UI elements and corresponding visual pattern labels.

The visual-pattern detection service 140 is configured to feed the screenshots to the trained detection model 145 and to receive from the trained detection model 145 a set of bounding boxes and corresponding visual pattern labels.

In some embodiments, a bounding-box-to-DOM matching module 210 of the visual-pattern detection service 140 is configured to associate each bounding box with at least one DOM element in the enriched DOM representation. In some embodiments, the bounding-box to DOM matching module 210 is further configured to apply heuristics that consider geometric overlap, containment relationships, pointer-interaction hints, visibility rules, and historical association data to identify, for each bounding box, a DOM element and a unique selector that best represent the visually detected component.

A DOM-semantic classifier 220 is configured to determine semantic pattern labels for DOM elements using the enriched DOM representation. The DOM-semantic classifier 220 is configured to evaluate accessibility roles, ARIA attributes, state and property values, hierarchical grouping, list membership, and other structural features, and to apply a semantic pattern algorithm that assigns a semantic pattern label to each candidate element. The visual pattern labels produced by the trained detection model 145 and the semantic pattern labels produced by the DOM-semantic classifier 220 are provided to a pattern-association engine 240.

A component root resolution engine 230 is configured to determine, for each element whose pattern is to be tested, a component root within the DOM hierarchy. The component root resolution engine 230 is configured to group elements into tight-ancestor clusters based on similarity of bounding boxes, containment, and semantic hints, to traverse ancestor relationships to identify the highest ancestor whose bounding region still corresponds to the visually unified component, and to select the component root as the element within this cluster that best reflects the interactive target used by assistive technologies.

The pattern-association engine 240 is configured to combine the visual and semantic pattern labels using a contingency table in addition to the identified component root. The pattern-association engine 240 is configured to use the contingency table to determine, for each element, whether the combination of visual and semantic labels indicates a final pattern type with a sufficiently high confidence score, an accessibility violation, or a case requiring further uncertainty handling. The pattern-association engine 240 is further configured to transmit pattern-type determinations and violation signals to downstream modules.

In some embodiments, an interactive-probing module 250 is configured to perform controlled interactions on elements whose pattern remains uncertain after the pattern-association engine 240 consults the contingency table. The interactive-probing module 250 is configured to simulate user inputs such as keyboard events, mouse clicks, and focus changes on the candidate component root and to observe resulting DOM mutations, focus transitions, accessibility metadata changes, and navigation attempts. The interactive-probing module 250 is further configured to apply pattern-specific decision logic to map observed behaviors, such as opening a modal, expanding a disclosure section, updating numeric values, or navigating to a new URL, to a final pattern type and to generate updated pattern determinations for those elements. The interactive-probing module 250 is configured to mitigate unauthorized side effects of the simulated interaction by cancelling or reversing navigation and closing transient overlays when necessary.

Pattern-specific testing suite 260 is configured to execute accessibility validations that correspond to each final pattern type and component root. Upon receiving a finalized pattern classification, the pattern-specific testing suite 260 is configured to select and execute a set of accessibility tests tailored to that pattern, where each test reflects expected interaction behaviors, semantic exposure, and state transitions associated with the pattern. The tests may evaluate, among other aspects, whether the component exposes an appropriate accessibility role and accessible name, whether the component is reachable and operable via keyboard navigation, whether focus is correctly managed during interaction, whether state changes such as expansion, selection, activation, or dismissal are properly conveyed through accessibility metadata, and the like. During test execution, the pattern-specific testing suite 260 is configured to monitor DOM mutations, focus changes, ARIA attribute updates, and the like associated with a component to detect deviations from expected behavior of the component.

Accessibility report interface 270 is configured to aggregate detection data, pattern determinations, and accessibility test results into an accessibility report dashboard viewable on the client device 120. The accessibility report interface 270 is configured to aggregate results of the accessibility validations (e.g., from the data store 150) and organize the results by UI component, component root, and final pattern type, and present detected accessibility issues together with contextual information that enables interpretation and remediation. The aggregated data may include, among other information, the visual and semantic pattern determinations, identifiers for the affected components, descriptions of violated accessibility requirements, and metadata indicating severity or relevance to accessibility guidelines. In some embodiments, the accessibility report interface 270 is configured to present the accessibility report as an interactive dashboard that allows users to navigate between components, filter or sort issues, and inspect detailed test outcomes for individual patterns.

In some embodiments, an element-fingerprinting module (not shown) is further configured to apply an element-fingerprinting mechanism based on semantic hierarchies and accessible-name paths so that repeated scans, even under DOM evolution, can be correlated to the same logical issues for presentation in the accessibility report interface 270. In some embodiments, the component testing system 130 interfaces with, and may be injected into, the browser-side analysis module 125 executing within a browser on a client device 120. In this embodiment, the component testing system 130 executes locally within the browser environment and performs semantic analysis, component root resolution, contingency-table mechanism, uncertainty handling, and pattern-specific accessibility testing directly against the live DOM of the web page. The component testing system 130 may operate as part of, or in coordination with, the browser-side analysis module 125, sharing access to the enriched DOM representation, accessibility metadata, and runtime interaction capabilities provided by the browser environment. In some embodiments, component testing system 130 executing via the browser-side analysis module 125 is configured to transmit selected data to the visual-pattern detection service 140 over a network (e.g., network 110, FIG. 1).

In some embodiments, the modules and engines described in FIG. 2 are implemented as software components executing on one or more processors of the visual-pattern detection service 140 and component testing system 130 and communicate over network 110 or through local inter-process communication. The arrangement of modules shown in FIG. 2 is illustrative, and the functions of individual modules may be combined or subdivided while still performing the method described herein.

Figure 3:
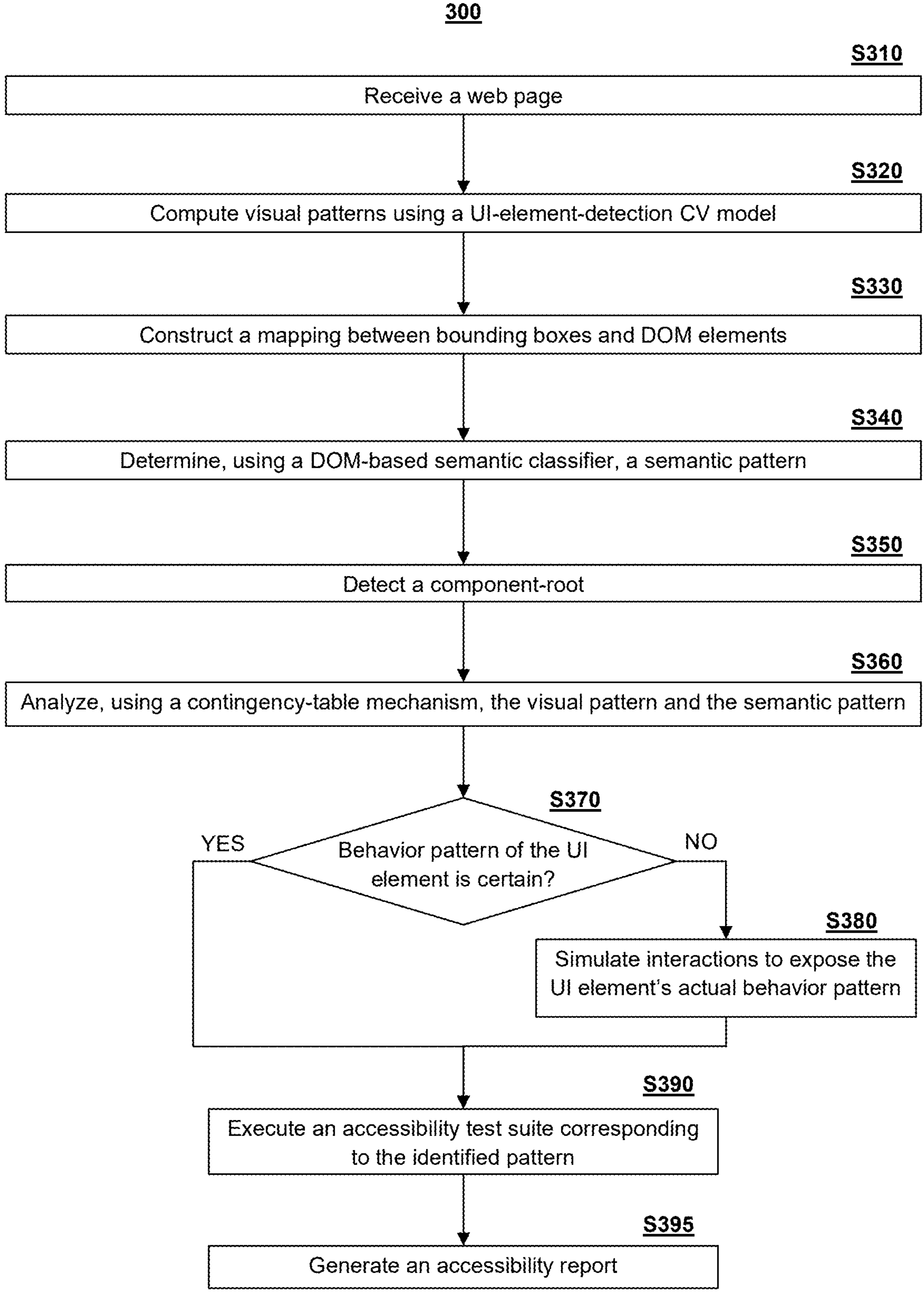
FIG. 3 is a flowchart of an example process for improved detection of behavior pattern of web UI components according to an embodiment.

FIG. 3 is a flowchart of an example process 300 for improved detection of behavior pattern of web UI components according to an embodiment.

At S310, a web page is received. In some embodiments, the web page is received by a processing engine that is operative to load the web document into a browser-controlled environment and capture both rendered screenshots of the web page and a structured representation of the DOM. The DOM representation may be enriched with augmented attributes including computed accessibility metadata, element bounding rectangles, accessibility roles, event listeners, accessible names, and visibility state. The screenshots and enriched DOM representation together form the multi-modal input set utilized by the system.

At S320, visual patterns are computed using a trained detection model. In some embodiments, the trained detection model (e.g., trained detection model 145) is trained on web page screenshots, and the trained detection model is configured to output bounding boxes, confidence values, and predicted visual pattern labels such as "button", "menu button", "checkbox", "tab", or other identifiable UI patterns. In some embodiments, this trained detection model is trained using large, annotated corpora of UI screenshots and is optimized to detect visually recognizable interface components regardless of their underlying DOM semantics. The trained detection model is configured to produce visual detections that represent what a sighted user is expected to perceive.

At S330, a mapping between each bounding box and its corresponding DOM element is constructed. In some embodiments, the bounding boxes are associated with DOM nodes by evaluating geometric overlap between the detected bounding boxes and the DOM-reported bounding rectangles of each element.

In some embodiments, a heuristic procedure is applied for cases where multiple DOM elements overlap the same bounding box, where an element contains nested structural wrappers introduced by component frameworks, or where the visually clickable region is not located at the node carrying semantic attributes. The heuristic considers proportional coverage, containment relationships, pointer-interaction hints, visibility rules, historical element-selection logic, a combination thereof, and the like. In some embodiments, a unique selector is assigned to each matched DOM node so that subsequent stages may address the element consistently.

In some embodiments, steps S320 and S330 are performed by a single trained visual-pattern detection model that is configured to assign visual pattern labels directly to DOM elements using visual cues alone, such as a rendered screenshot of a web page and produces pattern labels that are already associated with specific DOM elements.

At S340, a semantic pattern is determined using a DOM-based semantic classifier. This semantic classifier is configured to read accessibility-related metadata including ARIA roles, ARIA states, ARIA relationships, hierarchical grouping, list structures, indicators of composite patterns, a combination thereof, and the like. The semantic classifier is further configured to interpret derived accessibility attributes generated in the enriched DOM representation, such as whether an element is keyboard-focusable, clickable, or has a semantic label or accessible name. In some embodiments, a method, to be discussed in more detail herein, determines the semantic pattern value for each DOM element. This semantic classification produces a second, independent pattern prediction signal that reflects how assistive technologies interpret the element.

In some embodiments, steps S320 through S340 are performed by a single multi-modal pattern detection model configured to analyze both visual cues from the rendered web page and structural and semantic information derived from the DOM. In this embodiment, the single multi-modal detection model is configured to receive as input a screenshot of the rendered interface together with DOM features such as element hierarchy, attributes, accessibility metadata, and layout information, and produces semantic pattern labels directly associated with DOM elements.

In a further embodiment, steps S320 and S340 are merged into a single visual-and-DOM pattern detection stage, and step S330 is an operation that follows the merged steps of S320 and S340. In this embodiment, a detection model is configured to analyze both the rendered visual appearance of the web page and DOM-derived features to produce semantic pattern labels. The detection model of the merged steps S320 and S340 is configured to output pattern predictions that incorporate both visual and DOM context but are not yet mapped to specific DOM elements. Step S330 is subsequently performed to map the outputs with DOM elements.

At S350, a component root is detected. In some embodiments, for each element whose pattern is to be tested, a tight-ancestor algorithm is executed to determine the component root of the UI component that is the proper target for accessibility testing. In some embodiments, the bounding box associated with the visual detection is evaluated against DOM ancestry, and elements whose bounding boxes fall within a defined similarity threshold are grouped into a tight-ancestor cluster. The DOM hierarchy is traversed upward until an ancestor is found that satisfies a predefined condition. The predefined condition may be met, for example, when the ancestor's bounding region ceases to reflect the visually unified component's footprint, when the ancestor's subtree contains unrelated content, a combination thereof, and the like. In some embodiments, the component root is selected as the highest ancestor within this tight-ancestor cluster that also satisfies semantic criteria such as carrying a structural role, being focusable, or being the element that screen-reader users would directly interact with. This ensures that accessibility testing is conducted on the true semantic target of the component, rather than on a wrapper or decorative container.

At S360, conflicts between the visual pattern and the semantic pattern are resolved using a contingency-table mechanism. In some embodiments, a contingency table is constructed in advance from empirical pattern-mining procedures conducted on large datasets of annotated pages, in which each possible visual-semantic combination is associated with one of a plurality of system actions. Using the contingency table, it is determined whether the visual and semantic predictions converge to a single pattern with high confidence, whether the combination indicates an accessibility violation, or whether the combination remains uncertain and requires an additional phase of interactive resolution.

In some embodiments, after the component root has been identified, uncertainty resolution is performed for patterns that may require further investigation as determined by the contingency mechanism. Simulated user interactions are executed on the component root or its associated sub-elements to induce observable DOM mutations that clarify the behavior of the element. For example, a text-input-type element may be probed by applying arrow-key inputs to distinguish between a text box, a spin button, and a combo box; a suspected menu or modal launcher may be activated to determine whether opening the component produces a pop-up menu, a modal dialog, a disclosure panel, or a navigational transition; and a button-like element may be tested with keyboard activation and click activation to determine the correct interaction profile. Mutations to focus order, DOM structure, ARIA attributes, visible content, and browser navigation state are monitored to determine the element's functional identity. In some embodiments, the uncertainty-resolution mechanism includes countermeasures to preserve the test context, including mechanisms for canceling navigation attempts, closing dialogs that appear during probing, and restoring focus state after destructive actions. The result of the interactive resolution step is the final pattern determination for the component.

At S370, it is determined whether the behavior pattern of the web UI element is certain. If YES, execution returns with S390. If NO, execution proceeds with S380.

In some embodiments, statistical techniques may be applied to entries in the contingency table that allow the actual behavioral pattern to be determined with certainty, without using further simulated interaction with the web UI component.

At S380, targeted interactions configured to expose the UI element's actual behavioral pattern are simulated. These interactions may include keyboard inputs such as arrow keys, Enter, or Space; pointer activations including clicks or simulated taps; or observation of DOM mutations such as navigation events, modal openings, list expansions, or updates to ARIA attributes. The interactions are selected so as to reveal whether the element behaves as a textbox, combo box, spin button, simple button, menu button, modal trigger, disclosure control, or some other pattern class. The system continuously monitors DOM changes, attribute transitions, and focus shifts to determine which behavioral signature matches established pattern definitions.

At S390, an accessibility test suite corresponding to the identified pattern is executed using a component testing system. The component testing system is configured to evaluate the expected keyboard interactions, screen-reader announcements, ARIA attributes, focus management requirements, navigational constraints, content-update behaviors, a combination thereof, and the like prescribed for that specific UI pattern. During the execution of these tests, the component testing system is configured to track mutations to the DOM, focus location, accessibility tree, accessibility metadata, a combination thereof, and the like. Violations of expected behaviors are recorded as accessibility issues associated with the target component.

At S395, an accessibility report is generated. The report consolidates all violations identified for each tested element, associates them with the appropriate selectors and component roots, and incorporates metadata such as severity and WCAG criterion applicability. In some embodiments, a consolidation mechanism may further correlate elements across multiple scans or testing environments using an accessibility-fingerprinting method based on semantic hierarchies and accessible-name paths, ensuring that issues remain identifiable even if the page structure changes.

Although FIG. 3 shows example blocks of process 300. In some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
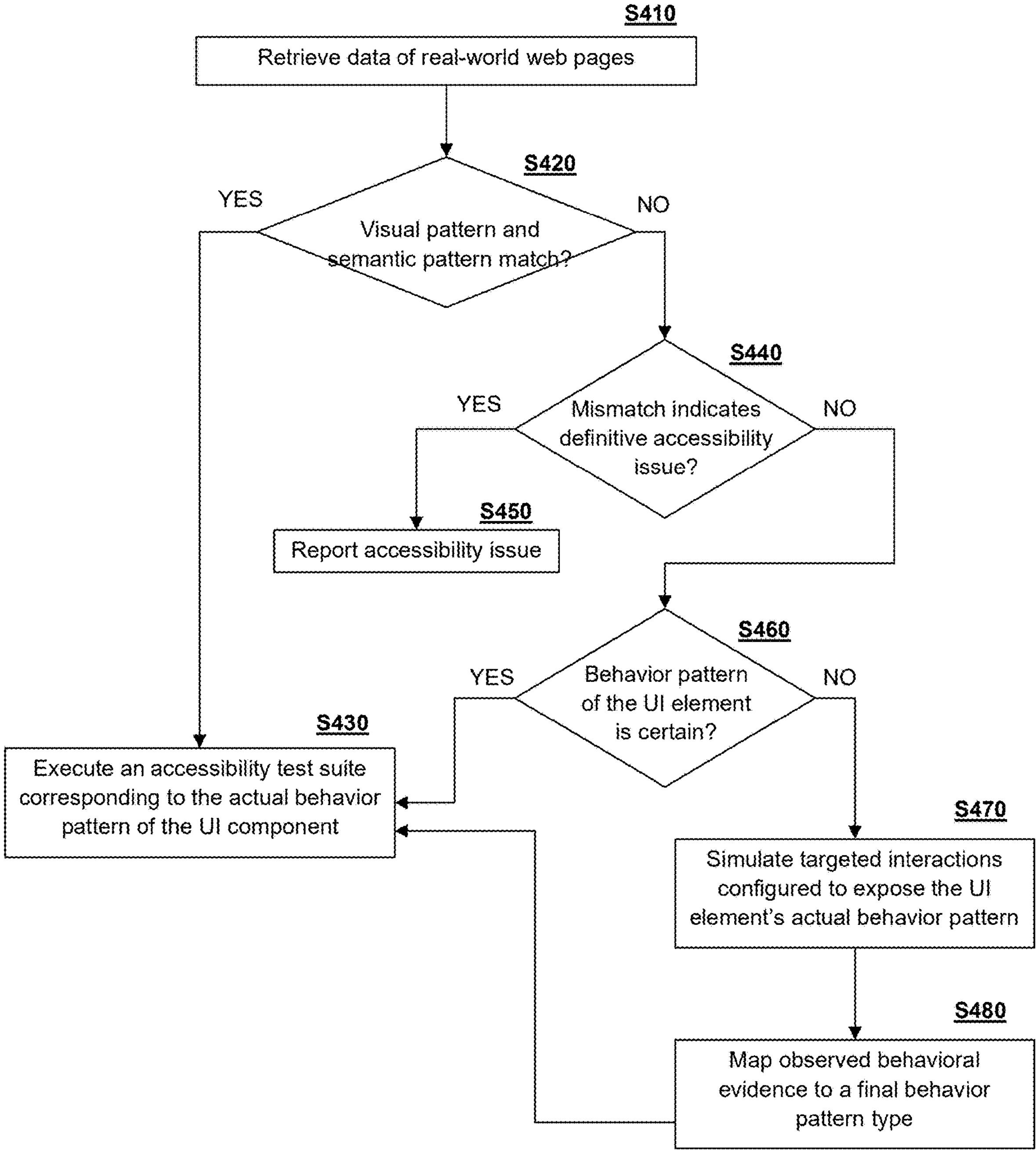
FIG. 4 is a flowchart of an example process for analyzing the visual pattern and the semantic pattern using a contingency-table mechanism to resolve pattern detection conflicts according to an embodiment.

FIG. 4 is a flowchart of an example process 400 for analyzing the visual pattern and the semantic pattern using a contingency-table mechanism to resolve pattern detection conflicts according to an embodiment.

At S405, a component root associated with a candidate UI element is determined. In some embodiments, a component root resolution module (component root resolution engine 230) is configured to apply a tight-ancestor algorithm within the DOM hierarchy to identify a component root that represents a visually unified and semantically meaningful UI component. This process may include grouping DOM elements into tight-ancestor clusters based on similarity of bounding boxes, visual containment relationships, spatial overlap, and semantic hints such as ARIA roles or accessibility attributes. Ancestor traversal continues until the highest ancestor is identified whose bounding region still corresponds to a single, visually cohesive component. From this cluster, the element that most closely reflects the interactive target exposed to assistive technologies is selected as the component root. In some embodiments, the component root serves as an alignment key for associating visual pattern labels, semantic pattern labels, and subsequent contingency table operations.

At S410, a visual-semantic pattern pair is retrieved for the component root. In some embodiments, a contingency-table mechanism is configured to retrieve a visual pattern label generated by a trained visual-pattern detection model and a semantic pattern label derived from semantic analysis of the DOM, accessibility tree, ARIA roles, attributes, and related metadata associated with the component root. The visual-semantic pattern pair uniquely characterizes the potentially conflicting interpretations of the same UI component.

At S420, it is determined whether the visual pattern and the semantic pattern match. A match may occur when both pattern sources indicate the same component class, such as both identifying the component as a link, button, carousel, dialog, or the like. If the patterns match, execution proceeds to S430. If the patterns do not match, execution proceeds to S440.

In some embodiments, determining whether the visual pattern and the semantic pattern match includes executing a machine-implemented resolution logic that evaluates the visual classification and the semantic classification of the candidate UI element to determine an appropriate resolution action for the candidate UI element.

At S430, an accessibility test suite corresponding to the actual behavior pattern is executed. When the visual pattern and semantic pattern match, the behavior pattern of the UI component is designated as certain, and the matching pattern is selected as the final pattern for the component root. In such cases, the test suite validates expected accessibility behaviors for the component type, including keyboard interaction, focus management, accessible name computation, role consistency, state changes, assistive-technology exposure, and the like. During testing, mutations to the DOM, accessibility tree, focus location, and accessibility metadata may be tracked, and deviations from expected behavior are recorded as accessibility issues associated with the component root.

At S440, it is determined whether the mismatch indicates a definitive accessibility issue. If YES, execution proceeds with S450. If NO, execution proceeds with S460.

An indication of a definitive accessibility issue may include a conflict between the visual and semantic patterns that will cause an accessibility issue above a certainty threshold. The certainty threshold may be predefined, changed dynamically, a combination thereof, and the like. In some embodiments, the certainty threshold may be computed as a weighted combination of various factors, including, but not limited to, a model confidence produced by the trained detection model for the predicted visual pattern; a value computed through the contingency-table mechanism indicating strength of association between the predicted visual pattern and a semantic pattern (e.g., normalized frequency, conditional probability, mutual information, or other association metric derived from representative visual-semantic pairs).

For example, a component whose semantics and appearance diverge (e.g., a visually identified button that is assigned a dialog role) in such a way that the component is not accessible by users of assistive technologies may be classified as invalid. In such cases, the contingency table engine detects an accessibility issue directly, without further interaction, and the component may be excluded from further behavioral analysis (e.g., no accessibility test suite is performed).

At S450, in response to determining that there is a definitive accessibility issue, an accessibility issue report is generated. In some embodiments, generating an accessibility report includes generating a structured issue record that identifies various identifiers including, but not limited to, the web page (e.g., URL, page identifier, build version), the candidate UI element and/or component-root (e.g., DOM path, selector, internal component identifier), the definitive behavioral pattern and corresponding mismatch type, and supporting evidence such as one or more bounding rectangles, screenshots (or cropped regions), extracted accessibility metadata (e.g., role, accessible name, state), and/or results of interactive probing (e.g., event sequence and observed UI state transitions). The accessibility issue report is stored in a data store and/or presented via an accessibility report interface (e.g., accessibility report interface 270, FIG. 2), including a human-readable description of the issue, a severity score, and a recommended remediation action.

At S460, it is determined whether the actual behavior pattern of the UI element is certain. If yes, execution returns with S430. If no, execution proceeds with S470. In some embodiments, determining whether the actual behavior pattern of the candidate UI element is certain includes executing a machine-implemented resolution logic that evaluates the visual classification and the semantic classification of the candidate UI element to determine an appropriate resolution action for the candidate UI element. When the resolution logic determines that a definitive behavioral pattern is certain (e.g., can be assigned to the candidate UI element), an accessibility test suite selected according to the definitive behavioral pattern is executed.

In some embodiments, the visual pattern and semantic pattern are analyzed in a preconstructed contingency table. The contingency table enumerates combinations of visual patterns and semantic patterns and prescribes resolution action for each combination. In some embodiments, the table includes hundreds of rows representing observed or theoretically possible combinations derived from empirical analysis of real-world web content. Each entry in the contingency table specifies one of several resolution types and associated resolution action based on a resolution logic derived from the empirical analysis. The resolution logic is determined for entries in the contingency table based on computed statistical measures. In some embodiments, the statistical measures are computed by evaluating the entries against a knowledge base derived from expert accessibility analysis, assistive-technology testing, and observed interaction behavior. Statistical measures may include frequency of occurrence across the dataset, consistency of observed behavior among examples sharing the same visual-semantic pairing, degree of agreement or disagreement between visual and semantic predictions, and likelihood that the pairing corresponds to a single underlying behavior pattern. An example contingency table is disclosed with respect to FIG. 6.

In some embodiments, a first resolution type indicates that the behavior pattern is nevertheless certain (e.g., can be determined with high confidence) despite the mismatch. For example, if a semantic role explicitly identifies a component as a carousel using an ARIA role description, the contingency table may specify that the component should be treated as a carousel regardless of conflicting visual cues. In such cases, execution returns to S430.

In other embodiments, a second resolution type indicates that the behavior pattern is uncertain but potentially resolvable through further interaction. For example, a component may visually resemble a checkbox while exposing link semantics, or may appear as a generic button while its semantics suggest a dialog container. In such cases, the contingency table engine may invoke an uncertainty-handling stage, and execution proceeds to S470. In some embodiments, when the resolution logic determines that a definitive behavioral pattern of the candidate UI element is not certain, an interactive-probing mechanism is invoked to determine a definitive behavioral pattern of the candidate UI element.

In still further embodiments, a third resolution type indicates that the combination is invalid, unsupported, or the like. These cases may correspond to hypothetical or extremely rare combinations that lack sufficient empirical data, such as a component that visually resembles a slider while exposing tablist semantics. In some embodiments, when such an entry is encountered, the component is omitted from further analysis. In other embodiments, when such an entry is encountered, the component undergoes further analysis to improve the contingency table mechanism.

At S470, targeted interactions are simulated to expose the actual behavioral pattern of the component. In some embodiments, an uncertainty-handling module performs a controlled sequence of interactions on the component root, including keyboard inputs such as arrow keys, Enter, or Space; pointer activations such as clicks or taps; and observation of resulting DOM mutations, navigation attempts, modal dialog openings, content expansions, or updates to accessibility attributes. The interactions are selected according to a predefined switch-case structure tailored to the candidate patterns indicated by the contingency table. For example, a text input may be tested with arrow-key input to distinguish between a text box, combo box, or spin button, while a button may be activated once to determine whether it triggers navigation, opens a dialog, expands a menu, or performs a simple action.

During these interactions, changes to the DOM, accessibility tree, focus state, and page context are monitored. In some embodiments, protective mechanisms are employed to counteract destructive context changes, such as preventing permanent navigation away from the page or programmatically closing modal dialogs after detection, thereby allowing continued analysis within a stable page state.

At S480, observed behavioral evidence resulting from the targeted interactions is mapped to a final behavior pattern. The observed behavioral evidence is mapped to expected behavioral signatures for known component classes. When a single pattern class is confirmed, the final pattern for the component root is established. It should be noted that the contingency table is not updated at runtime based on this resolution. The resolved pattern is used to select and execute the corresponding accessibility test suite. Execution then proceeds to S430, where accessibility testing is performed based on the finalized behavior pattern. Execution of the corresponding accessibility test suite is performed by component testing system 130, FIG. 1.

Through this process, FIG. 4 illustrates how the contingency-table mechanism serves as a deterministic resolution layer that integrates visual detection, semantic inference, and empirical accessibility expertise to resolve pattern conflicts, invoke uncertainty handling when appropriate, and enable accurate, pattern-specific accessibility evaluation of web UI components.

Although FIG. 4 shows example blocks of flowchart 400, in some implementations, flowchart 400 may include additional blocks, fewer blocks, different blocks, or differently arranged blocks than those depicted in FIG. 4. Additionally, or alternatively, two or more of the blocks of flowchart 400 may be performed in parallel.

Figure 5:
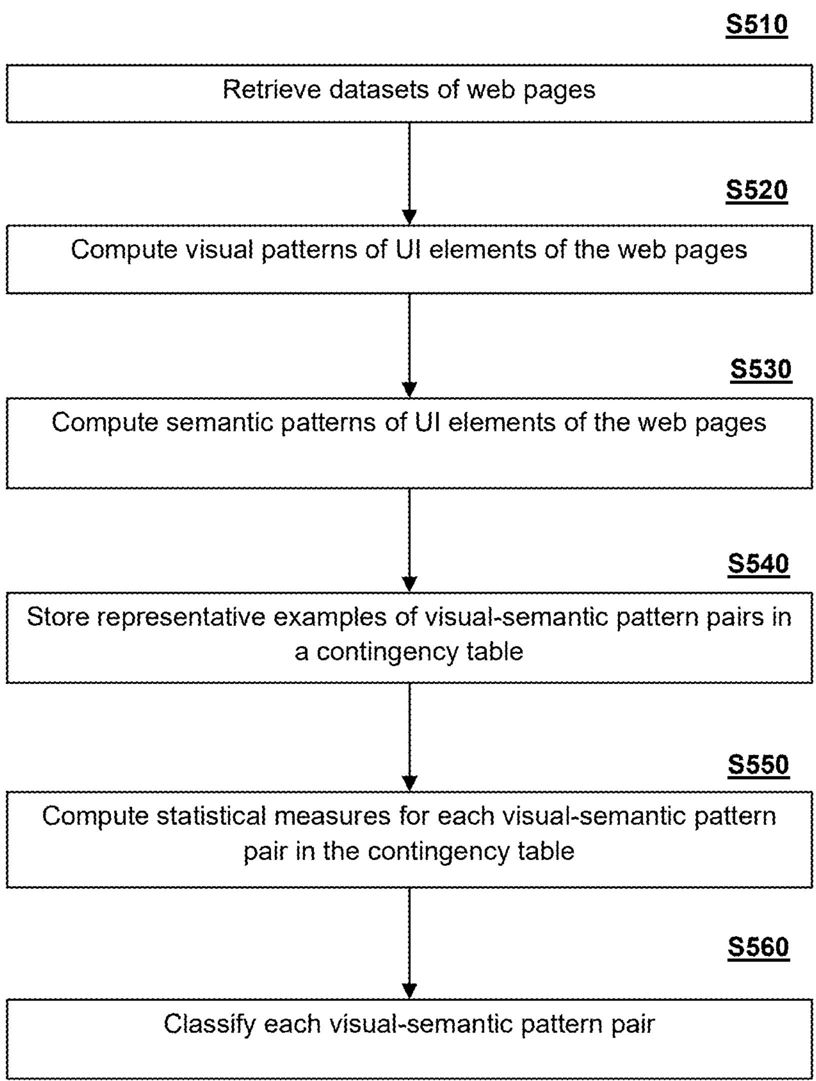
FIG. 5 is a flowchart illustrating an example process for constructing a contingency table configured to resolve conflicts between visual pattern detection and semantic pattern inference for web user interface (UI) components, according to an embodiment.

FIG. 5 is a flowchart illustrating an example process 500 for constructing a contingency table configured to resolve conflicts between visual pattern detection and semantic pattern inference for web user interface (UI) components, according to an embodiment. The process 500 represents a preparatory procedure used to generate, validate, and populate the contingency table subsequently used during runtime analysis, as described with reference to FIGS. 4 and 6.

At S510, datasets of web pages are retrieved. In some embodiments, the datasets comprise collections of real-world web pages obtained from one or more sources, including client-supplied repositories, automated crawling systems, publicly available web corpora, or combinations thereof. Each dataset may include rendered page screenshots, corresponding DOM states, accessibility trees, computed styles, bounding-box coordinates, and associated accessibility metadata captured at the time of rendering.

At S520, visual patterns of UI elements contained in the web pages are computed. In some embodiments, each web page in the dataset is processed by a trained visual-pattern detection model (e.g., trained detection model 145, FIG. 1) configured to analyze rendered page images. The trained detection model outputs, for each detected UI element, a visual pattern label and associated spatial information, including bounding-box coordinates. Visual pattern labels may include, for example, button, navigation menu, breadcrumb, carousel, dialog container, accordion, footer, and the like. Each visual pattern label is associated with a component root determined using a tight-ancestor algorithm, such that the visual pattern corresponds to a visually unified component rather than an isolated DOM node.

In some embodiments, the rendered page images along with a prompt are fed to a language model (e.g. a Large Language Model). The prompt is configured to instruct the language model to output a pattern label based on the UI elements in the rendered page images.

At S530, semantic patterns of the UI elements are computed. In some embodiments, semantic pattern computation is performed using a semantic-analysis module (DOM-semantic classifier 220, FIG. 2) that evaluates DOM structure, accessibility metadata, ARIA roles, role descriptions, attributes, and inferred relationships between elements. The semantic pattern is computed for the same component root associated with the visual pattern.

In some embodiments, to compute the semantic pattern of each UI element, a deterministic ruleset is applied to classify the semantic pattern of each UI element based on the element's role, attributes, DOM hierarchy, a combination thereof, and the like. In some embodiments, the semantic pattern is computed using a trained machine learning model configured to classify an element's pattern based on information such as, but not limited to, the element's styles, accessibility metadata, interaction listeners and the like.

At S540, representative examples of visual-semantic pattern pairs are stored. In some embodiments, for each observed UI element instance, the computed visual pattern label and the computed semantic pattern label are paired together to form a visual-semantic pattern pair associated with the component root. These paired labels, along with references to the underlying examples (e.g., DOM snapshots, screenshots, interaction logs), are stored for further analysis.

In some embodiments, the stored visual-semantic pattern pairs are queried to identify all distinct combinations of visual pattern labels and semantic pattern labels observed across the dataset. For each distinct combination, one or more representative examples are selected and stored as rows in the contingency table. The contingency table thus enumerates observed and edge-case combinations of visual and semantic interpretations encountered in real-world web content.

At S550, statistical measures associated with the visual-semantic pattern pairs are computed. In some embodiments, representative examples for each combination are evaluated against a knowledge base derived from expert accessibility analysis, assistive-technology testing, and observed interaction behavior. Statistical measures may include frequency of occurrence across the dataset, consistency of observed behavior among examples sharing the same visual-semantic pairing, degree of agreement or disagreement between visual and semantic predictions, and likelihood that the pairing corresponds to a single underlying behavior pattern.

For example, if a large number of UI elements are visually identified as checkboxes but semantically identified as links, and if the majority of observed examples trigger navigation when activated, the statistical measures may indicate a high likelihood that such a pairing should be analyzed as a link for accessibility purposes.

At S560, each visual-semantic pattern pair in the contingency table is classified. In some embodiments, classification assigns a resolution type and, where applicable, a final behavior pattern to each row of the contingency table. The classification is based on the computed statistical measures and expert evaluation of actual observed behavior. In some embodiments, classification includes assigning a definitive behavior pattern, marking the pairing as requiring uncertainty handling, identifying the pairing as an inherent accessibility violation, or designating the pairing as invalid. The resulting classification determines how the contingency table will resolve the pairing during runtime analysis and which accessibility test suite, if any, will be applied.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 illustrates an example contingency table 600 configured to resolve conflicts between semantic patterns and visual patterns detected for web user interface (UI) components, according to an embodiment. The contingency table 600 is used by the contingency-table mechanism described with reference to FIGS. 4 and 5 to determine how a component root should be classified, whether further uncertainty handling is required, and whether accessibility issues should be reported.

The contingency table 600 comprises multiple rows, each corresponding to a specific visual-semantic pattern pairing, and multiple columns that encode resolution logic derived from empirical analysis, expert accessibility review, and observed behavior across real-world web content.

Semantic Pattern 602 identifies the semantic classification inferred for the component root based on DOM structure, accessibility tree data, ARIA roles, role descriptions, attributes, and inherited semantics. Example semantic patterns include breadcrumb, button, dialog, list, list-item, menu-popup, or N/A when no reliable semantic pattern exists.

Complexity 604 qualifies the semantic pattern with additional context, such as whether the semantic pattern is derived from a simple role, an advanced structure, or a specific behavioral configuration. For example, a breadcrumb may be marked as advanced (alternating list of links), indicating a non-trivial semantic structure that affects how conflicts should be resolved.

Visual Pattern 606 identifies the visual classification assigned to the component root by the visual-pattern detection model. Visual patterns represent appearance-based interpretations such as, but not limited to, card-horizontal, form, accordion, carousel, slider, or search-magnifying-glass.

Visual Pattern Type 608 categorizes the visual pattern into a broader structural or behavioral class, such as layout, landmark, interactive, composite, composite-layout, or popup. This categorization provides context about how the visual pattern behaves or is composed.

Resolution type 610 specifies the prescribed resolution outcome for the corresponding visual-semantic combination. Resolution types may include ignore, semantic-pattern, uncertain-pattern, visual-pattern, or accessibility-issue. The resolution type governs whether the component should be analyzed further, routed to an uncertainty handler, directly tested as a resolved pattern, or flagged as an accessibility issue.

Final Pattern 612 identifies the resolved behavior pattern that should be used to select an accessibility test suite, when applicable. In some cases, the final pattern is marked as N/A when no further analysis is performed or when the resolution action is to report an issue. In other cases, intermediate values such as uncertain Interactive or uncertain Navigation indicate invocation of the uncertainty-handling stage.

Issue Type 614 identifies the nature of the accessibility issue, when the resolution type indicates that an issue should be raised. Example issue types include, but is not limited to, suspicious semantics, semantics conflict with visual appearance, missing semantics, wrong semantics.

The following examples corresponding to rows 1-12 of the contingency table 600 illustrate various embodiments.

For example, row 1 illustrates a semantic pattern of breadcrumb combined with a visual pattern of card-horizontal and a visual pattern type of layout. The resolution type is ignore. Although not explicitly shown in the table, the underlying logic is that card-based layouts may contain lists of links, and analyzing such containers as navigational components introduces significant uncertainty. To avoid misclassification, the system suppresses analysis of this combination.

Row 2 shows a semantic pattern of breadcrumb paired with a visual pattern of form and a landmark visual pattern type. The resolution type is accessibility-issue, with an issue type of suspicious semantics. The logic is that forms should not contain navigational components such as breadcrumbs; at most, they may contain steppers. Accordingly, the system avoids analyzing the element as navigation and instead expects to find a form landmark semantic. If such semantics are missing or inconsistent, an accessibility violation is reported.

Row 3 combines a semantic pattern of breadcrumb with a visual pattern of button-spin, and an interactive pattern type. This combination results in an accessibility-issue resolution, with an issue type of semantics conflict with visual appearance. The logic is that a container with breadcrumb semantics is extremely unlikely to present as a fine-grained interactive or textual control, such as a spin button. The system therefore raises an issue or suppresses further analysis due to the implausibility of the combination.

Row 4 illustrates a semantic pattern of button with a visual pattern of editable-textbox, and an interactive visual pattern type. The resolution type is uncertain-pattern, and the final pattern is uncertain Interactive. The logic reflects that buttons and editable-textboxes may be styled interchangeably, and many advanced components (such as toggle buttons, disclosures, switches, modal launchers, menu buttons, and search icons) are derived from button semantics. Consequently, the system invokes the uncertainty handler to activate the element and observe post-interaction behavior to determine the correct interactive pattern while performing additional accessibility evaluations.

Row 5 shows a semantic pattern of dialog combined with a visual pattern of carousel, and a composite visual pattern type. The resolution type is semantic-pattern, and the final pattern is dialog. The logic is that a dialog role represents a strong semantic identification, and because dialogs are layout containers, they may contain a wide variety of visual structures, including carousels. The semantic signal therefore overrides the visual pattern.

Row 6 combines a semantic pattern of dialog with a visual pattern of disclosure-accordion, and an interactive visual pattern type. The resolution type is uncertain-pattern, with a final pattern of uncertain Interactive. The logic is that a popup or dialog role may be accidentally placed on a controller element rather than on the popup itself. The system therefore treats this as an interactive uncertainty case and invokes further behavioral analysis.

Row 7 pairs a semantic pattern of dialog with a visual pattern of slider, and an interactive visual pattern type. The resolution type is accessibility-issue, with an issue type of semantics conflict with visual appearance. As with Row 3, the logic is that a dialog container presenting visually as a fine-grained interactive control is highly implausible, warranting issue reporting or suppression.

Row 8 illustrates a semantic pattern of list combined with a visual pattern of accordion, and a composite visual pattern type. The resolution type is uncertain-pattern, and the final pattern is uncertain Navigation. The logic is that many navigational or composite elements lack explicit semantics. Given the existence of the uncertainty handler, it is safer to invoke it. The handler may (1) defer to interactable-role validation if the element is interactive, (2) ignore simple textual containers, (3) analyze the element if a pattern can be resolved through interaction, or (4) report a missing-semantics violation otherwise.

Row 9 shows a semantic pattern of list with a visual pattern of dialog, and a popup visual pattern type. The resolution type is accessibility-issue, with an issue type of missing semantics. The logic is that a dialog-like visual presentation requires dialog semantics, and their absence constitutes a violation.

Row 10 illustrates a case where the semantic pattern is N/A and the visual pattern is slider-multi-thumb, and a composite-layout visual pattern type. The resolution type is visual-pattern, and the final pattern is multi-thumb-slider. The logic is that multi-thumb sliders often lack strong semantics. When the visual identification is confident and semantic signals are weak, analysis may proceed by attempting to identify child slider components. If no semantic structure is discovered, the analysis terminates without error.

Row 11 pairs a semantic pattern of list-item with a visual pattern of search-magnifying-glass, and an interactive visual pattern type. The resolution type is accessibility-issue, with an issue type of wrong semantics. The logic is that the element appears interactive, and therefore an interactable role violation can be reported directly at detection time. For diagnostic clarity, a dedicated issue identifier may be used while sharing messaging with existing interactable-role validations.

Row 12 combines a semantic pattern of menu-popup with a visual pattern of checkbox-group-classic, and a composite-layout visual pattern type. The resolution type is ignore. The logic is that the visual pattern lacks meaningful semantics, and its combination with navigational semantics yields low confidence in both detections. Given the uncertainty, the system performs no further analysis.

Figure 7:
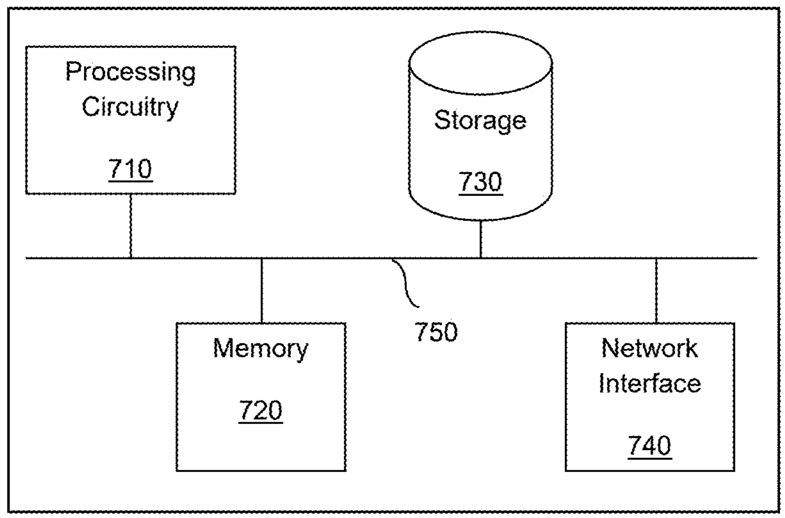
FIG. 7 is an example schematic diagram of a component testing system according to an embodiment.

FIG. 7 is an example schematic diagram 700 of a component testing system 130 according to an embodiment. The component testing system 130 includes, according to an embodiment, a processing circuitry 710 coupled to a memory 720, a storage 730, and a network interface 740. In an embodiment, the components of the component testing system 130 are communicatively connected via a bus 750.

In certain embodiments, the processing circuitry 710 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 720 is a volatile memory (e.g., random access memory, etc.), a non-volatile memory (e.g., read only memory, flash memory, etc.), a combination thereof, and the like. In some embodiments, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein is stored in the storage 730, in the memory 720, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 710, cause the processing circuitry 710 to perform the various processes described herein, in accordance with an embodiment.

In some embodiments, the storage 730 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 740 is configured to provide the component testing system 130 with communication with, for example, the network 110, according to an embodiment.

It should be understood that the embodiments described herein are not limited to the specific architecture illustrated in FIG. 7, and other architectures may be equally used without departing from the scope of the disclosed embodiments.

Furthermore, in certain embodiments, the visual-pattern detection service 140 may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for resolving conflicting user-interface (UI) component classifications for accessibility testing comprising:

determining, for a rendered user-interface component in a document object model (DOM), a component root for a candidate UI element using a tight-ancestor DOM traversal;

generating, using a trained visual-pattern detection model operating on rendered pixel data, a visual-pattern label for the component root;

generating, for the candidate UI element, a semantic-pattern label using a semantic classification engine that evaluates at least accessibility metadata;

executing a machine-implemented resolution logic that evaluates the visual-pattern label and the semantic-pattern label of the candidate UI element to determine an appropriate resolution action for the candidate UI element; and when the resolution logic determines that a definitive behavioral pattern can be assigned to the candidate UI element, executing an accessibility test suite selected according to the definitive behavioral pattern.

2. The method of claim 1, wherein when the resolution logic determines that a definitive behavioral pattern of the candidate UI element is not certain, invoking an interactive-probing mechanism to determine a definitive behavioral pattern of the candidate UI element.

3. The method of claim 2, wherein the interactive-probing mechanism further comprises:

simulating input events directed to the candidate UI element; and evaluating DOM mutations as a result of the simulated input events to determine a definitive behavioral pattern of the candidate UI element.

4. The method of claim 1, wherein when the resolution logic identifies at least inadequate semantics associated with the candidate UI element, generating an accessibility violation signal without executing an accessibility test suite.

5. The method of claim 1, wherein the resolution logic is implemented using a contingency-based classification mechanism that encodes empirically derived relationships between visual-pattern labels, semantic-pattern labels, and behavioral analytics of various UI elements.

6. The method of claim 5, wherein the contingency-based classification mechanism is implemented using a multi-dimensional data structure that stores resolution rules derived from statistical analysis of UI behavior across a corpus of web pages.

7. The method of claim 1, further comprising retrieving, by one or more processors, datasets of rendered web pages including rendered visual representations and corresponding DOM states;

computing, for a plurality of UI elements extracted from the datasets, respective visual-pattern labels using the trained visual-pattern detection model operating on rendered pixel data;

computing, for the plurality of UI elements, respective semantic-pattern labels using the semantic classification engine; and storing representative pairs of computed visual-pattern labels and semantic-pattern labels in a multi-dimensional data structure that encodes the resolution logic for each pair.

8. The method of claim 7, wherein storing the representative pairs further comprises:

computing, for each pair, one or more statistical measures characterizing observed behavioral outcomes of the corresponding UI elements; and classifying each pair according to a resolution category selected from a plurality of resolution categories, wherein each resolution category corresponds to a resolution action.

9. The method of claim 7, further comprising:

computing a component root for each UI element of the plurality of UI elements, wherein the component root represents a target component for accessibility testing; and generating, in the multi-dimensional data structure, an alignment key, using the component root, to associate the visual pattern labels and semantic-pattern labels.

10. A non-transitory computer-readable medium storing a set of instructions for resolving conflicting user-interface (UI) component classifications for accessibility testing, the set of instructions comprising:

one or more instructions that, when executed by one or more processing circuitries of a device, cause the device to:

determine, for a rendered user-interface component in a document object model (DOM), a component root for a candidate UI element using a tight-ancestor DOM traversal;

generate, using a trained visual-pattern detection model operating on rendered pixel data, a visual-pattern label for the component root;

generate, for the candidate UI element, a semantic-pattern label using a semantic classification engine that evaluates at least accessibility metadata;

execute a machine-implemented resolution logic that evaluates the visual-pattern label and the semantic-pattern label of the candidate UI element to determine an appropriate resolution action for the candidate UI element; and when the resolution logic determines that a definitive behavioral pattern can be assigned to the candidate UI element, execute an accessibility test suite selected according to the definitive behavioral pattern.

11. A system for resolving conflicting user-interface (UI) component classifications for accessibility testing comprising:

a processing circuitry;

a memory, the memory containing instructions that, when executed by the processing circuitry, configure the system to:

determine, for a rendered user-interface component in a document object model (DOM), a component root for a candidate UI element using a tight-ancestor DOM traversal;

generate, using a trained visual-pattern detection model operating on rendered pixel data, a visual-pattern label for the component root;

generate, for the candidate UI element, a semantic-pattern label using a semantic classification engine that evaluates at least accessibility metadata;

execute a machine-implemented resolution logic that evaluates the visual-pattern label and the semantic-pattern label of the candidate UI element to determine an appropriate resolution action for the candidate UI element; and when the resolution logic determines that a definitive behavioral pattern can be assigned to the candidate UI element, execute an accessibility test suite selected according to the definitive behavioral pattern.

12. The system of claim 11, wherein when the resolution logic determines that a definitive behavioral pattern of the candidate UI element is not certain invoking an interactive-probing mechanism to determine a definitive behavioral pattern of the candidate UI element.

13. The system of claim 12, wherein the memory contains further instructions that, when executed by the processing circuitry for the interactive-probing mechanism, further configure the system to:

simulate input events directed to the candidate UI element; and evaluate DOM mutations as a result of the simulated input events to determine a definitive behavioral pattern of the candidate UI element.

14. The system of claim 11, wherein when the resolution logic identifies at least inadequate semantics associated with the candidate UI element generating an accessibility violation signal without executing an accessibility test suite.

15. The system of claim 11, wherein the resolution logic is implemented using a contingency-based classification mechanism that encodes empirically derived relationships between visual-pattern labels, semantic-pattern labels, and behavioral analytics of various UI elements.

16. The system of claim 15, wherein the contingency-based classification mechanism is implemented using a multi-dimensional data structure that stores resolution rules derived from statistical analysis of UI behavior across a corpus of web pages.

17. The system of claim 11, wherein the memory contains further instructions which when executed by the processing circuitry further configure the system to:

retrieve, by one or more processors, datasets of rendered web pages including rendered visual representations and corresponding DOM states;

compute, for a plurality of UI elements extracted from the datasets, respective visual-pattern labels using the trained visual-pattern detection model operating on rendered pixel data;

compute, for the plurality of UI elements, respective semantic-pattern labels using the semantic classification engine; and store representative pairs of computed visual-pattern labels and semantic-pattern labels in a multi-dimensional data structure that encodes the resolution logic for each pair.

18. The system of claim 17, wherein the memory contains further instructions that, when executed by the processing circuitry for storing the representative pairs, further configure the system to:

compute, for each pair, one or more statistical measures characterizing observed behavioral outcomes of the corresponding UI elements; and classify each pair according to a resolution category selected from a plurality of resolution categories, wherein each resolution category corresponds to a resolution action.

19. The system of claim 17, wherein the memory contains further instructions which when executed by the processing circuitry further configure the system to:

compute a component root for each UI element of the plurality of UI elements, wherein the component root represents a target component for accessibility testing; and generate, in the multi-dimensional data structure, an alignment key, using the component root, to associate the visual pattern labels and semantic-pattern labels.

* * * * *